United States Patent Office 2,882,256
Patented Apr. 14, 1959

2,882,256

COPOLYMER OF UNSATURATED POLYESTER, STYRENE AND DIBUTYL FUMARATE OR DIBUTYL MALEATE AND PROCESS OF PREPARING SAME

Walter F. Waychoff, Manchester, Mo., assignor to Monsanto Chemical Company, St. Louis, Mo., a corporation of Delaware No Drawing. Application December 27, 1955
Serial No. 555,294

6 Claims. (Cl. 260—45.4)

This invention relates to improvements in styrene modified unsaturated polyester resins.

In the preparation of unsaturated polyester resins from dihydric alcohols and a mixture of an $\alpha,\beta$-ethylenically unsaturated aliphatic dicarboxylic acid and a saturated aliphatic dicarboxylic acid it has been observed that the resultant product often crystallizes on standing. To overcome this problem it was proposed that styrene be blended therewith in amounts of 10 to 100 parts per 100 parts by weight of the polyester resin and the resultant mass cured. While such blending and curing overcomes the crystallization problem, the ultimate polymer, whlie tough, suffers from lack of flexibility and as those skilled in the art are well aware has many other shortcomings.

It is an object of this invention to provide an improved styrene modified polyester resin of the type aforedescribed particularly as to gelling time, storage properties, resistance to water, flexibility, and light stability. The new resin is particularly useful in preparing glass laminates for structural materials.

In accordance with this invention when dibutyl fumarate or dibutyl maleate or mixtures thereof and styrene are admixed or blended with the aforedescribed unsaturated polyester resins in certain well-defined proportions and the resultant mass cured, the foregoing objects are attained. In the practice of this invention 15 to 75 parts by weight but preferably 25 to 50 parts by weight of styrene are used per 100 parts by weight of unsaturated polyester resin, and the amount of dibutyl fumarate or dibutyl maleate or mixture thereof per unit weight of styrene is 0.35 to 2.2 parts by weight but preferably 0.5 to 1.5 parts by weight.

The unsaturated polyesters of this invention are made by condensing about 50 chemical equivalents of a dihydric alcohol with about 50 chemical equivalents of a mixture of saturated and $\alpha,\beta$-ethylenically unsaturated aliphatic dicarboxylic acids. Generally the dihydric alcohol is employed in excess of that theoretically required.

The dihydric alcohol preferably used is propylene glycol, however, such may be replaced in whole or in part by such dihydroxy alkanes as ethylene glycol, 2,3-butylene glycol, 2,3-diamylene glycol, trimethylene glycol, 1,3-butylene glycol, tetramethylene glycol, and the like. It is preferred that the dihydroxy alkane contains not more than 6 carbon atoms.

The dibasic acid ingredients are a mixture of saturated and unsaturated aliphatic dicarboxylic acids in which the unsaturated acid constitutes 40 to 80 mol percent thereof, but preferably 60 to 75 mol percent thereof. Maleic acid or anhydride is the preferred $\alpha,\beta$-ethylenically unsaturated aliphatic dicarboxylic acid, but it may be replaced in whole or in part by other unsaturated dibasic acids such as fumaric acid, citraconic acid, mesaconic acid, dimethyl maleic acid, methyl ethyl maleic acid, and the like, or their anhydride. It is preferred that the $\alpha,\beta$-ethylenically unsaturated aliphatic dicarboxylic acid contain not more than 8 carbon atoms. The saturated aliphatic dicarboxylic acid is preferably adipic acid, however, it may be replaced in whole or in part by other saturated aliphatic dicarboxylic acids such as malonic acid, succinic acid, glutaric acid, methylmalonic acid, chlormalonic acid, acetylmalonic acid, methylsuccinic acid, methylglutaric acid, and the like, or their anhydrides. It is preferred that the saturated aliphatic dicarboxylic acids contain not more than 10 carbon atoms.

The alcohol and acid components of the polyester are reacted together at elevated temperatures ranging from 150 to 250° C., generally using an excess of the alcohol until an acid number of 10 to 75 is obtained.

In order to obtain the resins of this invention the base polyester resin must be mixed with styrene and dibutyl fumarate or dibutyl maleate, and a catalytic amount of free radical initiator for polymerization. Examples of catalysts which may be used are well known, but it is preferred that benzoyl peroxide, succinic peroxide, lauroyl peroxide, stearoyl peroxide, cocoanut oil acid peroxide, tert.butyl hydroperoxide, and like organic peroxide free radical initiators be employed. Usually only small amounts of the polymerization catalyst need be used, e.g. a catalytic amount in the range of 0.05 to 3% by weight based on the polymerizable resins, i.e. polyester resin-styrene-dibutyl fumarate or maleate.

The temperature at which the mixture of polyester resin-styrene-dibutyl fumarate or maleate-catalyst is polymerized may vary widely. When large quantities of catalyst are employed, the polymerization may take place at room temperature. Generally, and where possible, it is desirable to employ higher temperatures in order to shorten the polymerization time, e.g. 50° C. to 200° C.

In order to illustrate this invention is the following:

Example A

As unsaturated polyester base resin is prepared by heating the following charge at 200° C. until the acid number is about 30 to 40:

| | Mols |
|---|---|
| Adipic acid | 0.6 |
| Maleic anhydride | 1.4 |
| Propylene glycol | [1] 2.4 |

[1] 20% mol excess.

At the end of the condensation reaction the mass is cooled. The product is a viscous liquid unsaturated polyester resin.

Example B 100 parts by weight of the resin of Example A is blended with 50 parts by weight of styrene and thereto is added 1.5 part by weight of benzoyl peroxide. This mix is then heated at 70° C. for one hour, followed by heating at 125° C. for one hour, and the mass cooled to room temperature.

Example I (20% of styrene of Example B replaced by dibutyl fumarate based on equivalent olefin, i.e. —CH=CH—, unsaturation.)

100 parts by weight of the resin of Example A is blended with 40.0 parts by weight of styrene, 22.0 parts by weight of dibutyl fumarate, and 1.62 part by weight of benzoyl peroxide. The mix is then heated at 70° C. for one hour, followed by heating at 125° C. for one hour, and the mass cooled to room temperature.

Example II (40% of styrene of Example B replaced by dibutyl fumarate based on equivalent olefin, i.e. —CH=CH—, unsaturation.)

100 parts by weight of the resin of Example A is blended with 30.0 parts by weight of styrene, 44.1 parts by weight of dibutyl fumarate, and 1.74 parts by weight of benzoyl peroxide. The mix is then heated at 70° C. for one hour, followed by heating at 125° C. for one hour, and the mass cooled to room temperature.

The properties of the resins of Examples B, I and II are as follows:

|  | B | I | II |
|---|---|---|---|
| Gel time at 82° C., min | 5.5 | 8.25 | 9.25 |
| Cure time at 82° C., min | 7.5 | 11.0 | 12.25 |
| Peak exotherm, °F | 462 | 410 | 354 |
| Shelf life at room temperature, days | 14 | 23 | 25 |
| Water resistance, i.e. percent weight gained after 7 days | 2.5 | 1.8 | 1.6 |
| Rockwell hardness | M-99 | M-68 | M-8 |
| Light stability (Fadeometer): |  |  |  |
| Reflectance, original | 90 | 91 | 88 |
| Reflectance, after 300 hours | 80 | 85 | 84 |

Employing the procedures of Examples I and II but replacing dibutyl fumarate with an equal weight of dibutyl maleate substantially the same results are obtained.

Other specific base polyester resins may be employed than that of Examples I and II, for example the unsaturated polyester resins obtained by heating the following charges at 150 to 250° C. until an acid number in the range of 10 to 75 is obtained:

|  | Mols |
|---|---|
| 1. Adipic acid | 0.8 |
| Maleic anhydride | 1.2 |
| Propylene glycol | [1] 2.2 |
| 2. Adipic acid | 0.6 |
| Maleic anhydride | 1.4 |
| Ethylene glycol | [2] 2.3 |
| 3. Glutaric acid | 0.8 |
| Fumaric acid | 1.2 |
| Propylene glycol | [3] 2.4 |

[1] 10% excess.
[2] 15% excess.
[3] 20% excess.

It is to be understood that the description of this invention set forth hereinbefore is illustrative thereof and that modifications and variations thereof obvious to those skilled in the art may be made without departing from the spirit or scope of this invention, e.g. up to 10% of the dihydric alcohol may be replaced by such monohydric alcohols as methanol, ethanol, propanol, butanol, pentanol, octyl alcohol, allyl alcohol, etc., or such polyhydric alcohols as glycerol, mannitol, sorbitol, etc., and up to 10% of the total dibasic acid content may be replaced by such monobasic acids as acetic acid, propionic acid, formic acid, benzoic acid, acrylic acid, crotonic acid, or such polybasic acids as aconitic acid, citric acid, etc.

What is claimed is:

1. The process which comprises mixing 100 parts by weight of an unsaturated polyester resin, 15 to 75 parts by weight of styrene, 0.35 to 2.2 parts by weight per unit weight of styrene of a member of the group consisting of dibutyl fumarate, dibutyl maleate, and mixtures thereof, and a catalytic amount of an organic peroxide, and thereafter curing the mixture, the said unsaturated polyester resin being obtained by condensing substantially 50 chemical equivalents of a dihydroxy alkane with substantially 50 chemical equivalents of a mixture of a saturated aliphatic dicarboxylic acid and an $\alpha,\beta$-ethylenically unsaturated aliphatic dicarboxylic acid in which the latter constitutes 40 to 80 mol percent thereof.

2. The process which comprises mixing 100 parts by weight of an unsaturated polyester resin, 25 to 50 parts by weight of styrene, 0.5 to 1.5 parts by weight per unit weight of styrene of dibutyl fumarate, and a catalytic amount of an organic peroxide, and thereafter heat curing the mixture, the said unsaturated polyester resin being obtained by condensing substantially 50 chemical equivalents of a dihydroxy alkane with substantially 50 chemical equivalents of a mixture of a saturated aliphatic dicarboxylic acid and an $\alpha,\beta$-ethylenically unsaturated aliphatic dicarboxylic acid in which the latter constitutes 60 to 75 mol percent thereof.

3. The process which comprises mixing 100 parts by weight of an unsaturated polyester resin, 25 to 50 parts by weight of styrene, 0.5 to 1.5 parts by weight per unit weight of styrene of dibutyl fumarate, and a catalytic amount of benzoyl peroxide, and thereafter heat curing the mixture, the said unsaturated polyester resin being obtained by condensing substantially 50 chemical equivalents of propylene glycol with substantially 50 chemical equivalents of a mixture of adipic acid and maleic acid in which the latter constitutes 60 to 75 mol percent thereof.

4. The product of the process of claim 1.
5. The product of the process of claim 2.
6. The product of the process of claim 3.

References Cited in the file of this patent
UNITED STATES PATENTS

| 2,255,313 | Ellis | Sept. 9, 1941 |
| 2,441,799 | D'Alelio | May 18, 1948 |
| 2,491,409 | Kropa et al. | Dec. 13, 1949 |
| 2,773,049 | Cowee | Dec. 4, 1956 |